Jan. 27, 1953     G. HOHWART ET AL     2,626,811
EXPANSION ARBOR
Filed Oct. 1, 1949     3 Sheets-Sheet 1
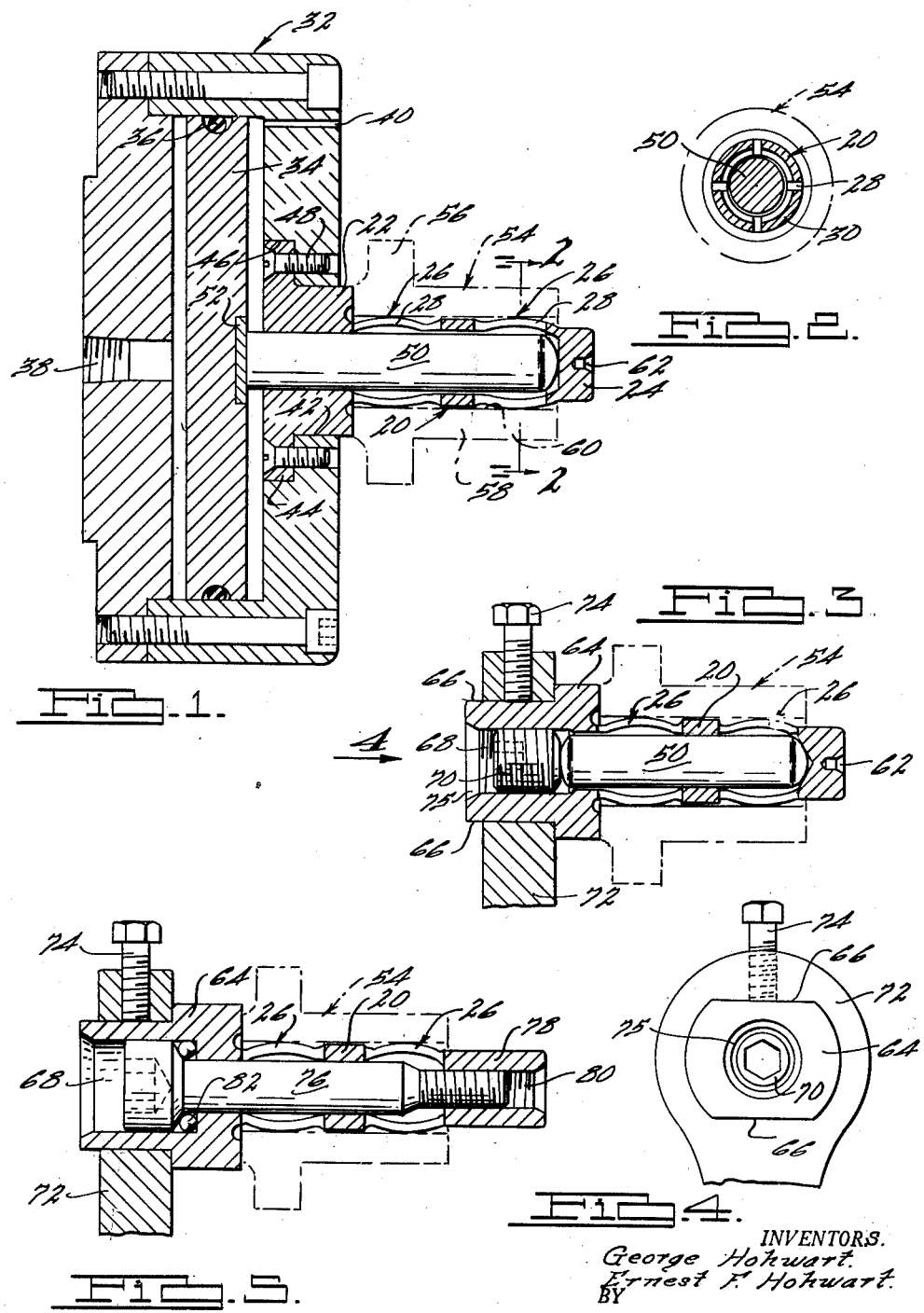
INVENTORS.
George Hohwart.
Ernest F. Hohwart.
BY
Harness, Dickey & Pierce.
ATTORNEYS.

Jan. 27, 1953 G. HOHWART ET AL 2,626,811
EXPANSION ARBOR
Filed Oct. 1, 1949 3 Sheets-Sheet 2
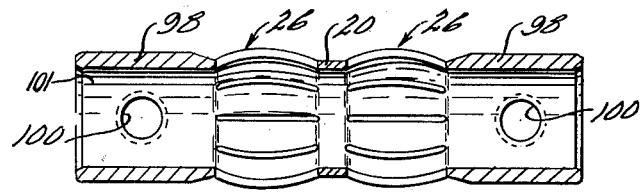
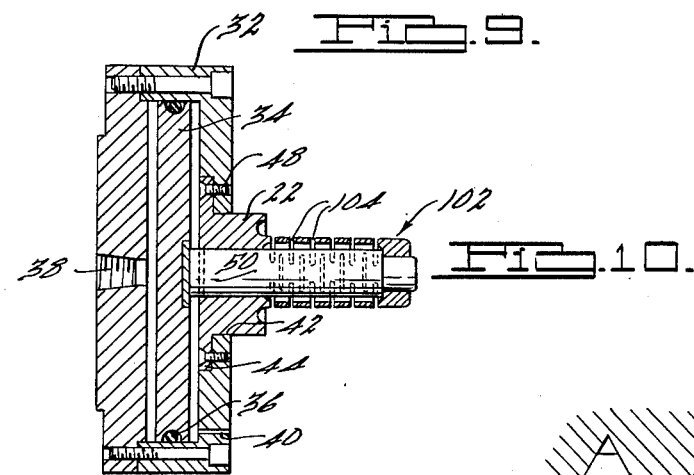
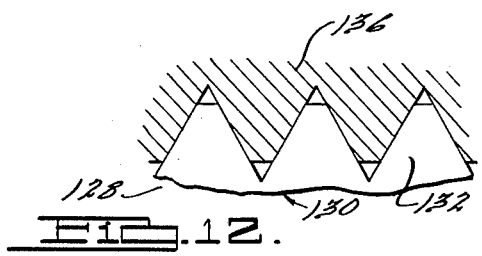
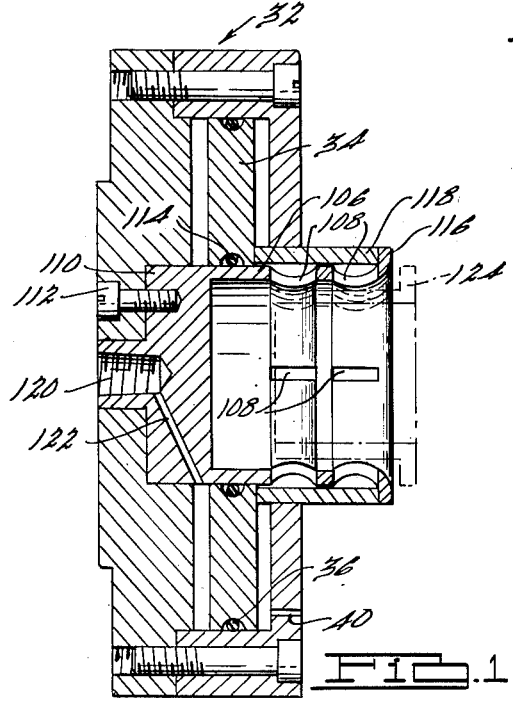
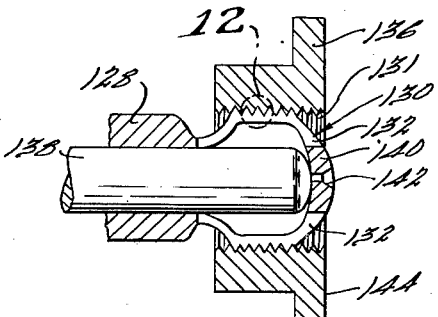
INVENTORS.
George Hohwart.
Ernest F. Hohwart.
BY
Harness, Dickey & Pierce
ATTORNEYS.

Jan. 27, 1953           G. HOHWART ET AL           2,626,811
EXPANSION ARBOR
Filed Oct. 1, 1949                                             3 Sheets-Sheet 3
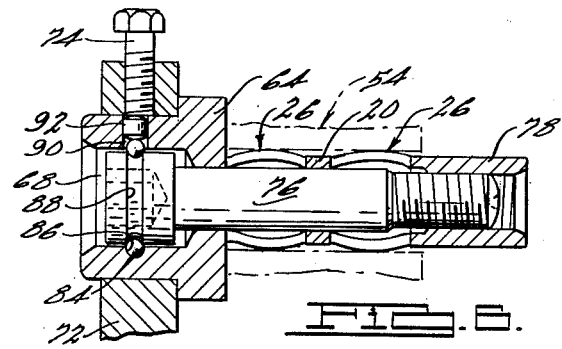
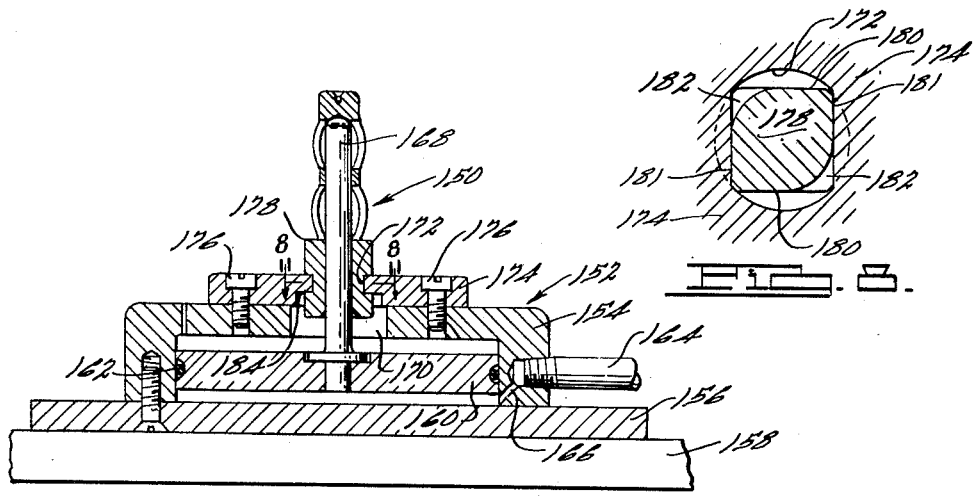
INVENTORS.
George Hohwart.
Ernest F. Hohwart.
BY
Harness, Dickey & Pierce.
ATTORNEYS.

Patented Jan. 27, 1953

2,626,811

UNITED STATES PATENT OFFICE 2,626,811

EXPANSION ARBOR

George Hohwart and Ernest F. Hohwart, Detroit, Mich., assignors to N. A. Woodworth Company, Ferndale, Mich., a corporation of Michigan Application October 1, 1949, Serial No. 119,192

23 Claims. (Cl. 279—2)

This invention relates to new and useful improvements in chucking devices.

An important object of the present invention is to provide a chuck that is adapted for either internal or external application to the work and which holds the latter solidly for a machining or other operation.

Another object of the invention is to provide a chuck of the above-mentioned character that can be uniquely constructed to clamp two or more different diameters at the same time.

Still another object of the invention is to provide a chuck which automatically centers the work with respect to the axis of the chuck.

Yet another object of the invention is to provide a chuck of the above-mentioned character having a plurality of chucking sections which operate independently to engage the work whereby the chuck is operative automatically to chuck a tapered hole on its true center.

A further object of the invention is to provide an arbor of the above-mentioned character in which no part slides or moves against or relative to another part to cause wear or to require lubrication which in turn causes the chuck to become dirty and gritty.

A still further object of the invention is to provide a chuck of the above-mentioned character that is capable of chucking a threaded part so as to permit an end of the work to be finished exactly at right angles to the axis of the threaded hole.

Other objects and advantages of the invention will be apparent during the course of the following description.

In the drawings forming a part of this specification and wherein like numerals are employed to designate like parts throughout the same:

Fig. 1 is a longitudinal, sectional view showing a chuck embodying the invention;

Fig. 2 is a transverse, sectional view taken on the line 2—2 of Fig. 1;

Fig. 3 is a longitudinal, sectional view showing a modified chuck construction embodying the invention;

Fig. 4 is an end elevational view looking in the direction of the arrows 4—4 of Fig. 3;

Fig. 5 is a longitudinal, sectional view showing another modified form of the invention;

Fig. 6 is a longitudinal, sectional view showing still another modified form of the invention;

Fig. 7 is a longitudinal, sectional view showing a chuck embodying the present invention in combination with a quick loading fixture;

Fig. 8 is a transverse, sectional view taken on the line 8—8 of Fig. 7;

Fig. 9 is a longitudinal, sectional view showing a device embodying the present invention adapted for use as a plug gage for inspection purposes;

Fig. 10 is a longitudinal, sectional view showing still another modified form of the invention;

Fig. 11 is a fragmentary, longitudinal, sectional view showing still another modified form of the invention adapted for chucking internally threaded workpieces;

Fig. 12 is an enlarged, sectional view of the portion of Fig. 11 enclosed in the circle 12; and Fig. 13 is a longitudinal, sectional view showing a chuck embodying the instant invention adapted for external chucking of a workpiece.

Reference is first had to the form of the invention illustrated in Figs. 1 and 2 which show an expansion arbor-type chuck embodying the invention mounted on a fluid-pressure-operated actuator means. The chuck is adapted for internal chucking and a typical workpiece is shown in broken lines on the chuck.

The expansion arbor chuck here shown by way of illustration is formed in one piece having a tubular body or arbor 20 and a mounting 22 at one end of the arbor. The chuck may be made of any material that is deformable and inherently resilient; however, it is contemplated that in most instances the chuck will be made of spring metal. The distal end 24 of the arbor 20, i. e., the end remote from mounting 22, is closed. Intermediate its ends, the tubular arbor 20 is formed with at least one but preferably two or more chucking or clamping sections 26. Two such sections are shown in the drawings.

The clamping sections 26 are disposed in spaced relation along the length of the arbor 20. In the particular form of the invention here shown by way of illustration, the inner clamping section 26 is disposed immediately adjacent the mounting 22, and the outer clamping section 26 is disposed behind and adjacent the closed outer end 24 of the arbor. Each clamping section 26 is formed with a plurality of circumferentially spaced, longitudinal slots 28 and the portions 30 of the arbor intermediate the slots are longitudinally arched in a direction radially outwardly of the arbor. All of the arched portions 30 are identical so that the surface generated by the outer surfaces of such portions is concentric to the axis of the arbor. Also, the arched portions 30 are symmetrical so that each clamping section 26 increases progressively in diameter from opposite ends thereof and so that the portion of greatest diameter is disposed substantially midway between the ends of the section. The clamping sections 26 are larger in diameter than the other portions of the arbor, and the inherent resiliency of the material from which the arbor is made makes it possible to reduce the sections somewhat in diameter by placing the arbor under tension.

If desired, the slots 28 may be filled with rubber or other suitable, elastic material to prevent dirt, grit and the like from entering the arbor 20 through the slots. Filling the slots 28 in this manner in no way impairs or affects the flexure characteristics of the clamping sections 26.

The fluid-pressure-operated actuator means here shown comprises a cylinder 32 having a piston 34 therein. Piston 34 is adapted to travel back and forth in cylinder 32 according to conventional practice, and the periphery of the piston is sealed against the internal wall of the cylinder by an O ring 36. Fluid under pressure is introduced into cylinder 32 behind piston 34 by any suitable or conventional apparatus through an opening 38 in the rear wall of the cylinder. Air or fluid trapped in the cylinder 32 ahead of piston 34 may escape through the vent 40 in the forward wall of the cylinder.

The mounting portion 22 of the arbor is fastened in coaxial relation on the forward wall of cylinder 32. In this connection it will be observed that the arbor extends forwardly through an opening 42 in the cylinder and that the mounting is formed at the rearward end thereof with a radial flange 44 that fits in a counterbore 46 at the inner side of the cylinder wall. Screws 48 fasten the mounting 22 solidly but removably to the cylinder. Thus, the mounting 22 is disposed flush with the inner surface of the forward cylinder wall, and thrust created when the arbor is tensioned is taken by the radial flange 44.

According to the present invention the arbor 20 is tensioned by a plunger 50 disposed therein and confined between the end 24 and the piston 34. If desired, a wear plate 52 may be set into the forward face of the piston 34 to provide a hard-wear-resistant seat for the plunger 50.

In practice, fluid pressure is introduced into the cylinder 32 behind piston 34 to tension the arbor 20 so that a workpiece 54 can be applied thereto. In this connection it will be apparent that thrust is exerted by the piston 34 against the forward end 24 of the arbor 20 through the medium of plunger 50. As suggested, tensioning of the arbor 20 in this manner elongates the clamping sections 26 and consequently reduces them somewhat in diameter. After a workpiece has been applied to the arbor 20, pressure against the piston 34 is released, and the inherent resiliency of the chuck causes the clamping sections 26 to expand against and to solidly grip the workpiece 54. In every instance, of course, care must be taken not to stress the arbor beyond its elastic limit.

The workpiece 54 here shown is in the form of a gear 56 having an elongated hub portion 58 and an internal bore 60. The chuck is made so that the clamping sections 26 normally are slightly larger in diameter than the diameter of bore 60. However, when the arbor 20 is tensioned in the manner hereinabove described, the clamping sections 26 are reduced sufficiently in diameter so work can be slipped easily onto the arbor. Thus, when pressure on the arbor is released, the clamping sections 26 expand against and tightly grip the walls of the bore 60 whereby to hold the work 54 securely for a turning, grinding, or other operation.

When making the chuck, the arbor 20 preferably is fashioned approximately to size and then ground to the final diameter while under tension. In this manner a proper fit between the chuck and the work is assured. Any desired tolerance can be maintained between the O. D. of clamping sections 26 and the internal bore 60 to be chucked.

In cases where the arbor is relatively long, it may be necessary to steady the distal end of the arbor 20. To this end a socket 62 is provided centrally in the end 24, which socket is adapted to receive the center of a tailstock or the like (not shown). Also, whenever it is necessary or desirable to add to the clamping pressure afforded naturally by inherent resiliency of the sections 26, the tailstock can be tightened against the arbor 20 to place the latter under compression. Manifestly, tightening of the tailstock in this manner increases the pressure exerted by sections 26 against the work.

In view of the foregoing it will be readily appreciated that, while the arbor 20 is here shown with two clamping sections 26, it may be made with only one clamping section or it may be made with three or more clamping sections depending upon the exigencies of the particular situation. In general, however, at least two clamping sections are desirable. Also, it will be readily apparent that, while the two clamping sections 26 are here shown identical in size and shape, they can be made of different diameters so as to properly fit a stepped bore or the like. Thus, it is contemplated that the arbor 20 be made to chuck two or more bores of different diameters at the same time. In addition to the above an important feature of the instant construction is that the arbor is capable of chucking a tapered bore in such manner that the bore is centered precisely on the arbor. If the taper angle of the bore is slight, an arbor having clamping sections of the same diameter may be used. However, if the taper angle of the bore is relatively great, it may be necessary to use an arbor having clamping sections of different diameters. In either case, however, precise centering of the workpiece on the arbor is assured.

Another important feature of the chuck is that there are no moving parts which are subject to wear by reason of relative motion between the parts or by reason of dirt and grit working in between the moving parts. The only movement involved in operation of the instant device is caused by flexure of the clamping sections 26; and if the slots 28 are closed by a mastic of rubber or the like, the arbor is entirely closed and sealed so that it is not affected by the presence of dirt, grit, and the like. Of course some wear may occur on the outer surface of the arbor. However, it is contemplated that, if desired, the working faces of the arbor can be provided with carbide or Stellite inserts which will resist abrasion and reduce the effects of wear to a minimum. Also, the external surfaces of the arbor can be reworked by plating in the event wear becomes excessive. Further, in this connection it is a feature of the invention that the external diameter of the chuck can be enlarged somewhat by plating if it is made slightly undersize through inadvertence or otherwise.

While the arbor portion of the chuck is here shown to be circular in transverse section, it will be readily appreciated that any tubular form is satisfactory. It is contemplated that the arbor be made round, square, or of any irregular shape.

Also, the clamping sections 26 can be made barrel-shaped as shown or they can be made with straight, angularly related faces which provide substantially this shape.

Attention is now directed to Figs. 3 and 4 which show a manually operated, screw-actuated chuck. The chuck is generally similar to the form first described but a screw actuator is substituted for the fluid-operated actuator. Also, the modification shown in Figs. 3 and 4 is adapted to be mounted between the centers of a lathe or the like and to be rotated by the head stock or other rotatably driven part of the machine.

Specifically, the arbor of the chuck shown in Figs. 3 and 4 is identical to the arbor of the chuck first described. However, the mounting portion 64 of the chuck is different. In the form shown, the mounting 64 is generally cylindrical and is formed with flats 66 at diametrically opposed sides thereof. Also, the mounting 64 is formed with a centrally located, internally threaded opening 68 which accommodates an Allen-head set screw 70. As perhaps best shown in Fig. 3, the plunger 50 projects into the opening 68, and the screw 70 seats against the projecting end of the plunger.

The chuck conveniently can be mounted between the centers of a lathe or the like. To this end the opening 68 is formed with a tapered outer surface 75 which provides a tapered annular seat for the headstock center.

A conventional driving dog 72 is applied to the mounting 64 and is detachably fastened thereto by a screw 74. In this connection it will be observed that the dog 72 is rotatably interlocked with the mounting 64 by reason of the flats 66. In practice, the dog 72 is engaged by a driving pin on the headstock or other part of the machine on which the device is mounted. The pin rotatably drives the dog 72 which in turn drives the chuck and the workpiece mounted thereon.

In operation, the clamping sections 26 are collapsed to receive the workpiece 54 by tightening set screw 70 against plunger 50. Conversely, the clamping sections 26 are released to engage the internal bore of the workpiece by retracting the set screw 70. Also, if desired, the pressure exerted by clamping sections 26 against the workpiece 54 can be selectively increased by tightening the tailstock or other part of the machine against the arbor.

Except for the features specifically pointed out above, the construction, operation, and advantages of this form of the invention are identical to the form first described.

The form of the invention shown in Fig. 5 is identical to the form shown in Figs. 3 and 4 except that a screw 76 is substituted for set screw 70 and plunger 50 and that the distal end of the arbor 20 is formed with an elongation 78 having an internally threaded bore 80 which receives the end of screw 76. In this form of the invention, the opening 68 is not internally threaded and the head of the screw 76 turns freely therein. Thrust bearings 82 interposed between the head of screw 76 and the bottom of opening 68 collectively provide an essentially antifriction support for the screw head.

In this form of the invention the arbor 20 is adapted to fit into the work 54 when the screw 76 is loose, and the clamping sections 26 are expanded against the work by tightening screw 76. In this connection, it will be observed that tightening screw 76 places the arbor 20 under compression and causes the clamping sections 26 to move radially outwardly against the work 54.

This form of the invention has the advantage that the pressure exerted by clamping sections 26 against the work 54 can be controlled precisely by the position of screw 76. The arbor 20 is made so that the work 54 can be slipped easily over the clamping sections 26 when screw 76 is loose. To clamp the work 54, screw 76 is tightened to place arbor 20 under compression and to expand clamping sections 26 radially outwardly against the work. Conversely, in order to release the work 54 it is merely necessary to loosen screw 76. Inherent resiliency of the material from which the arbor 20 is made causes clamping sections 26 to contract progressively as soon as the screw 76 is loosened. Thus, when the screw 76 is fully loosened, the work 54 may be easily removed from the chuck.

The form of the invention shown in Fig. 6 is identical to the form shown in Fig. 5, except that the bearings 82 are omitted and the head of screw 76 is held against axial movement in any direction by an annular series of anti-friction bearings 84 which fit in registering grooves 86 and 88 in the head of screw 76 and in the surrounding wall of opening 68. The individual ball bearings 84 are introduced into grooves 86 and 88 through a radial opening 90 in the mounting 64. After all of the ball bearings 84 have been inserted, the opening 90 is closed by a plug 92. It will be readily apparent, therefore, that ball bearings 84 hold the screw 76 axially fixed but permit it to rotate readily in the chuck.

In this form of the invention the arbor 20 is first placed under tension by rotating screw 76 in one direction. The clamping sections 26 preferably are normally slightly larger in diameter than the bore of the work 54 to be clamped, and the arbor is placed under sufficient tension to contract the clamping sections sufficiently so that the work can be fitted thereon. Thereafter the screw is reversely rotated to release the arbor and permit the clamping sections 26 to expand against the work by inherent resiliency therein. This form of the invention has the advantage that the force naturally exerted against the work by the clamping section 26 can be augmented by continuing to rotate screw 76 in the last-mentioned direction. This operation places the arbor under compression so that the screw 76 actually exerts a force tending to increase the pressure exerted naturally by the clamping sections 26 against the work 54.

Reference is now had to the form of the invention illustrated in Fig. 9 which shows a hand-operated arbor adapted primarily as a plug gage for inspection work, jig-boring and like operations. The arbor here shown is generally tubular in form for its entire length and is formed with two longitudinally spaced clamping sections 26 intermediate its ends. The terminal portions 98 of the arbor are solid, unbroken tubular sections which comprise hand grips for manipulating and handling the same in use. Clamping sections 26 are made intentionally weak so that the device can be pushed by hand into holes to be tested. In this type of work, it frequently is necessary to push the arbor into blind holes or to use the same in situations where the projecting end portion thereof cannot be easily grasped. Accordingly, each of the terminal portions 98 is provided with transverse openings 100 which are adapted to receive any suitable device such as a cross pin or the like that can be used in removing the arbor from the work. Also, the terminal portions 98 of the arbor are formed at the ends thereof with internal chamfers 101. These internal chamfers 101 provide seats for centers or the like in a testing machine, for example, and hold the arbor exactly concentric with respect to the centers.

The form of the invention shown in Fig. 10 is substantially identical to the form of the invention first shown, except that it has a modified arbor 102 which is uniquely constructed to have a uniform clamping action for substantially its entire length. In this form of the invention the arbor 102 is slotted transversely so that it can be expanded or contracted in the same manner as a helical spring. In the drawings we have shown a plurality of slots 104 at uniformly spaced points along the length of the arbor. Each slot 104 comprises a plurality of circumferentially spaced slot segments, and all of the slot segments in each slot are disposed in a single radial plane. The slot segments of adjacent slots 104 are disposed in staggered relation. However, a number of different slot arrangements can be utilized for this purpose and will be immediately suggested to those skilled in the art. For example it will be readily apparent that if desired the slot segments can be inclined slightly so that they collectively extend in a helical path along substantially the entire length of the arbor 102.

In operation, actuation of piston 34 to advance the plunger 50 tensions the arbor 102. As arbor 102 elongates under tension there is a corresponding reduction in diameter. Thus by stretching the arbor 102 it can be reduced sufficiently in diameter so that a workpiece which ordinarily would not fit thereon can be inserted thereover. As soon as pressure against the piston 34 is relaxed, however, inherent resiliency of the arbor causes the same to contract and simultaneously to expand against the workpiece. In this manner a clamping force is exerted radially outwardly against the workpiece for substantially the entire length of the arbor 102.

The form of the invention shown in Fig. 13 is adapted to chuck a workpiece externally. In other words, the workpiece is inserted into the chuck, and the latter clamps the outside surface of the work.

This form of the invention comprises a tubular arbor 106 having longitudinally spaced clamping sections 108 which are identical to the corresponding parts in the form of the invention first described, except that they are bowed or arched radially inwardly instead of radially outwardly. Also, in this form of the invention the arbor 106 extends centrally through the piston 34 and the rear mounting portion 110 thereof is fastened to the rear wall of cylinder 32 by screws 112. The joint between the piston 34 and the arbor 106 is sealed by an O ring 114. Thus, the arbor 106 is fixed to the cylinder 32 and the piston 34 is movable back and forth in the cylinder and on the arbor. On the forward end of the arbor 106 is a radial flange 116 which bears against the forward end of an outer sleeve 118. As clearly shown in the drawings, the sleeve 118 surrounds and is spaced circumferentially from the forward portion of arbor 106, and the rearward portion thereof extends through the forward wall of cylinder 32 and abuts the piston 34. Air under pressure is admitted into the cylinder 32 behind piston 34 through a socket 120 and a passage 122.

In operation, fluid pressure behind piston 34 advances the latter in cylinder 32 and pressure exerted by the piston through sleeve 118 tensions the arbor 106 and expands clamping sections 108 sufficiently so that a workpiece can be inserted into the arbor. The workpiece 124 here shown is merely representative of workpieces to be used with chucks of this type. The external diameter of the workpiece 124 is normally slightly larger in diameter than the normal internal diameter of the clamping sections 108. However, when the arbor 106 is tensioned in the manner described, the clamping sections 108 are expanded sufficiently so that the work 124 can be introduced therein. As soon as fluid pressure on piston 34 is relieved, inherent resiliency of the arbor 106 causes clamping sections 108 to contract and tightly clamp the work 124.

Reference is now had to the form of the invention illustrated in Figs. 11 and 12 which show a chuck uniquely constructed to clamp internally the threaded bore of a workpiece. This chuck is particularly valuable because it grips the workpiece absolutely solidly and holds the same precisely centered on the clamping arbor. Thus, the chuck provides a means for machining a face of a workpiece exactly square to a previously machined internal thread. To our knowledge, there is no known chuck capable of satisfactorily performing this operation.

The particular form of the invention shown in the drawings comprises an elongated, tubular arbor 128 having a single clamping section 130. The clamping section 130 here shown comprises a plurality of circumferentially spaced longitudinal slots 132. All of the slots 132 are coextensive, and the portions of the arbor between the slots are bowed radially outwardly so as to have a springiness or resiliency when the arbor 128 is stressed longitudinally. Also, in this form of the invention, the clamping section 130 is formed with a generally cylindrical peripheral surface which is externally threaded to receive the internally threaded bore 131 of a workpiece 136 when the arbor is longitudinally tensioned. A plunger 138 is mounted for longitudinal sliding movement in the arbor 128, and the distal end of the plunger bears against the closed forward end 140 of the arbor. The arbor 128 and the plunger 138 may be adapted for either mechanical or manual operation as in any of the forms of the invention heretofore described.

In making the device, the arbor 128 is first given the general form shown in the drawings and the clamping section 130 is then tensioned by applying force against the plunger 138. The outer surface of the clamping section 130 is then ground to a proper predetermined diameter and externally threaded while the arbor is under tension.

Thus, the workpiece 136 will thread easily on the clamping section 130 when the arbor 128 is tensioned. However, as soon as pressure against the arbor is relieved, the clamping section 130 flexes to its normal position; and as the clamping section flexes, it expands radially to jam the external threads against the internal threads of the work 136. This action binds the work 136 solidly to the arbor for a machining or other operation. If necessary or desirable, additional force may be imposed on the work by tightening the center point of a tailstock or equivalent mechanism against the distal end 140 of the arbor 128. To this end, a center receiving socket 142 is provided in the end 140. Since the slots 132 are equispaced around the circumference of the clamping section 130 and since the wall of the clamping section is of uniform thickness, all of the arched portions intermediate the slots exert a uniform pressure radially outwardly against the work 136. As a result, the work 136 is centered exactly on the axis of the arbor 120 and this axis coincides precisely with the axis of the internally threaded hole 131. This being true, any radial face of the workpiece, such as the face 144, for example, can be readily ground or machined exactly at right angles to the axis of the internally threaded bore 131.

Figs. 7 and 8 depict a fluid-pressure-operated, bench-type, loading chuck which is primarily adapted for use whenever high-production schedules demand quick loading and unloading of the chucks.

Specifically, a between-center-type arbor 150 is shown attached to a fluid-pressure-operated, quick-loading, bench-type fixture 152. The arbor 150 is detachably fastened to the fixture 152 in any suitable manner that will permit quick attachment and release thereof. The fixture 152 includes means for longitudinally stressing the arbor 150 so that a workpiece (not shown) can be fitted thereon.

In operation, the arbor 150 is fastened to the fixture 152 and the latter is operated to stress the arbor longitudinally. A workpiece is then slipped onto the arbor 150 and the fixture 152 is operated to relieve tension in the arbor. This action clamps the arbor and the workpiece together. The assembled arbor 150 and workpiece are then removed from the fixture 152 and transferred to the machine where work is to be performed on the workpiece. Other arbors are then applied to the fixture 152 and workpieces are loaded on each arbor in succession in the manner hereinabove described.

From the foregoing it will be readily apparent that while a between-center-type arbor is here shown, the instant arrangement can be adapted to any of the arbor types herein shown and to any type arbor within the scope of present invention.

In the specific form of the invention shown, the fixture 152 comprises a cylinder 154 having a base portion 156 which is fastened in any suitable manner on a bench or other suitable support 158. A piston 160 is mounted for reciprocation in the cylinder 154 and the joint between the annular wall of the cylinder and the periphery of the piston is sealed by an O ring 162. Air or hydraulic liquid under pressure is admitted to the cylinder 154 behind piston 160 through a tube 164 and passage 166. Any suitable or conventional apparatus may be used to supply fluid under pressure to the pipe 164. In this connection it will be observed that the cylinder 154 is mounted upright on the bench 158 and that hydraulic fluid is introduced into the cylinder from the side thereof. An upright plunger 168 press-fitted centrally into the piston 160 extends upwardly from the piston through an opening 170 in the top of cylinder 154 and through a central opening 172 in a mounting plate 174 which surmounts the cylinder and is fastened thereto by screws 176 or the like.

The mounting plate 174 provides a means for detachably fastening arbor 150 to the fixture 152. In this connection it will be observed that except for the mounting, the clamping arbor here shown is identical to the arbor in the form of the invention first described. In the instant embodiment the clamping arbor 150 is formed with a cylindrical mounting 178 having flats 180 on diametrically opposite sides thereof. Opening 172 is of the same size and shape as the terminal portion of mounting 178. Thus the mounting 178 can be inserted downwardly through opening 172 and the opening conforms to and loosely fits the mounting. Diametrically opposed concentric grooves 182 extend in opposite directions from substantially the middle of respective flats 180. Each groove 182 extends through an arc of substantially 90% and then tangentially to define stops 181. The undersurface of mounting plate 174 is recessed around the opening 172 to receive the portion of the mounting below grooves 182. The arcuate portions of grooves 182 permit the mounting 178 to be turned 90° in opening 172 to interlockingly engage the mounting with the mounting plate 174. Turning movement of the mounting 178 in the manner described brings stops 181 against the flat sides of opening 172 to prevent further rotation of the mounting and to hold the mounting properly interlocked with the mounting plate. By rotating the arbor a quarter of a turn in the opposite direction, it can be disengaged from the mounting plate 174 and removed from the fixture 152.

In use, the chucking arbor 150 is slipped downwardly on the plunger 168 and mounting 178 is inserted into opening 172 to bring grooves 182 into register with the mounting plate 174. The arbor is then rotated a quarter of a turn to interlock the mounting 178 with the mounting plate 174. Fixture 152 is then operated to stress the arbor 150 longitudinally, and the workpiece is fitted thereon. Thereafter the fixture 152 is operated to relieve pressure on the arbor 150 and the latter is disengaged from the fixture.

Manifestly, a great many arbors can be loaded very quickly in this manner. After machining operations on the workpieces have been completed they are, while still assembled on the arbors, returned to the fixture 152 for unloading.

It may thus be seen that we have achieved the objects of our invention. We have provided a chuck that can be constructed for either internal or external application to the work and which holds the latter solidly for a turning or other machining operation. When work is loaded on the chuck it is centered precisely on the arbor and is held securely for the machining operation. The clamping action of the chuck is unique in that it adapts itself automatically to a tapered bore and can be readily adapted to clamp bores of different diameters simultaneously. The chuck can be loaded or unloaded easily and quickly and the chuck can be adapted for use on a wide variety of standard machine tools.

Having thus described the invention, we claim:

1. An expansion arbor having an intermediate tubular chucking portion of deformable, inherently resilient material, and a circumferentially, continuous, tubular terminal portion said tubular chucking portion adapted to receive a workpiece to be chucked and having slots therein so as to be radially expansible and contractible to grip or release the workpiece, and said terminal portion maintaining a constant diametrical dimension regardless of the expanded or contracted condition of said chucking portion.

2. An expansion arbor having an intermediate, elongated, tubular chucking portion of deformable, inherently resilient material, and circumferentially, continuous, tubular terminal portions at opposite ends thereof, said tubular chucking portion adapted to receive a workpiece to be chucked, a plurality of circumferentially spaced, longitudinal slots in that part only of the tubular portion which coacts directly with the workpiece, said slots being substantially conterminous and correspondingly positioned in the chucking portion of the arbor and the arbor portions intermediate said slots being longitudinally arched, said slots permitting said arched portions to be readily expanded and contracted to grip or release the workpiece, and said terminal portions maintaining a constant diametrical dimension regardless of the expanded or contracted condition of said chucking portion.

3. An expansion arbor having an intermediate, elongated, tubular chucking portion of deformable, inherently resilient material, and circumferentially continuous tubular terminal portions, said tubular chucking portion adapted to receive a workpiece to be chucked, and a plurality of longitudinal slots in that part of the tubular portion which coacts directly with the workpiece, said slots being disposed in circumferentially, uniformly spaced relation in the tubular portion and the longitudinal sections of the arbor intermediate said slots being arched longitudinally and outwardly of the arbor; so that said chucking portion is expanded and contracted uniformly around its circumference by axial pressure imposed thereon to grip or release the workpiece, and said terminal portions maintaining a constant diametrical dimension regardless of the expanded or contracted condition of said chucking portion.

4. An expansion arbor having an elongated, tubular chucking portion of deformable, inherently resilient material adapted to receive a workpiece to be chucked, and circumferentially continuous tubular terminal portions at opposite ends of the arbor, a plurality of longitudinal slots in that part of the tubular portion which coacts directly with the workpiece defining a plurality of spring elements intermediate the slots, said spring elements being longitudinally arched inwardly of the arbor, said slots permitting said tubular portion to be readily expanded and contracted to grip or release the workpiece, said slots being arranged in the chucking portion so that the latter expands and contracts uniformly about its circumference when axial pressure is imposed thereon, and said terminal portions maintaining a constant diametrical dimension regardless of the expanded or contracted condition of said chucking portion.

5. An expansible arbor having an intermediate tubular chucking portion of deformable, inherently resilient material, and circumferentially continuous tubular terminal portions, said tubular chucking portion having a section in which the radial dimension of the wall becomes progressively larger from opposite ends thereof and said section having a plurality of longitudinal slots disposed in substantially spaced relation thereon, whereby said section is radially expansible and contractible to grip or release a workpiece associated therewith when pressure is applied axially against said tubular portion, and said terminal portions maintaining a constant diametrical dimension regardless of the expanded or contracted condition of said chucking portion.

6. An expansible arbor having a tubular chucking portion of deformable, inherently resilient material, said tubular portion having alternate expansible and rigid sections, there being at least two expansible sections, and each expansible section having a plurality of longitudinal slots, whereby said expansible sections are radially expansible and contractible to grip or release a workpiece associated therewith when pressure is applied axially against said tubular portion.

7. A chucking arbor comprising in combination an elongated tubular body, and a mounting on the body for fastening the same to a machine tool, said body having a pair of longitudinally spaced, closely adjacent, longitudinally extensible, inherently resilient and flexible portions, said portions being equal in diameter and each of said portions increasing progressively in diameter from opposite ends thereof, said portions adapted to grip a workpiece at longitudinally spaced points and rendered operative to release said workpiece by placing said body under tension.

8. A chucking arbor comprising in combination an elongated tubular body, and a mounting on the body for fastening the same to a machine tool, said body having a pair of longitudinally spaced, closely adjacent, inherently resilient and radially flexible portions, both of said portions being larger in diameter than the portions of said body immediately adjacent thereto, said portions adapted to grip a workpiece at longitudinally spaced points and rendered operative to release said workpiece by longitudinally stressing said body.

9. A chucking arbor comprising an elongated tubular body having a pair of longitudinally spaced, closely adjacent, inherently resilient and radially flexible portions, both of said portions being larger in diameter than the portions of said body immediately adjacent thereto, said portions adapted to grip a workpiece at longitudinally spaced points and rendered operative to release said workpiece by longitudinally stressing said body.

10. An expansion arbor having a tubular chucking portion of deformable, inherently resilient material, said chucking portion having longitudinally spaced sections adapted to receive and to clamp a workpiece, each of said sections having a plurality of coextensive, circumferentially spaced, longitudinal slots and the portions of said sections intermediate said slots being longitudinally arched radially outwardly of the body, said arched portions adapted to engage the workpiece at longitudinally spaced points and operable to disengage said workpiece by longitudinally stressing said chucking portion.

11. In a chucking machine, a cylinder, a coaxial, tubular extension on one end of said cylinder, said tubular extension having a pair of radially flexible, inherently resilient sections and said sections being larger in diameter than the portions of said extension immediately adjacent thereto, a piston in said cylinder, and a plunger slidable in said tubular extension bearing at one end against the distal end of said extension and at the other end thereof against said piston, said plunger being operable by said piston to place said body under tension whereby to reduce the external diameter of said flexible sections so that a workpiece can be slipped onto said extension, and said sections being operative by inherent resiliency therein to engage and tightly clamp said workpiece when tension on the body is released.

12. An expansion arbor having an elongated tubular body of deformable, inherently resilient material, said body adapted to extend into a workpiece to be chucked and having axially spaced, longitudinally slotted portions, said slotted portions being longitudinally arched radially outwardly of the body and adapted to engage the workpiece at longitudinally spaced points, a plunger in the body, an internal seat for said plunger adjacent one end of the body, and actuator means engageable with said plunger to press the same against said seat so as to place said body under tension and to contract said longitudinally arched portions sufficiently so that a workpiece can be slipped thereon, whereby inherent resiliency of said body causes said arched portions to expand against and tightly clamp the workpiece when tension on the body is released.

13. An expansion arbor having an elongated tubular body of deformable, inherently resilient material, said body adapted to extend into a workpiece to be chucked and having axially spaced, longitudinally slotted portions, said slotted portions being longitudinally arched radially outwardly of the body and adapted to engage the workpiece at longitudinally spaced points, a plunger in the body, an internal seat for said plunger adjacent one end of the body, and manually operable means in the other end of said body engageable with said plunger to press the same against said seat.

14. An expansion arbor having an elongated tubular body of deformable, inherently resilient material, said body adapted to extend into a workpiece to be chucked and having axially spaced, longitudinally slotted portions, said slotted portions being longitudinally arched radially outwardly of the body and adapted to engage the workpiece at longitudinally spaced points, a plunger in the body, an internal seat for said plunger adjacent one end of the body, an internally threaded bore at the other end of said body receiving the terminal portion of said plunger, and a screw threaded into said bore, said screw engaging the adjacent end of said plunger and operative to press the same against said internal seat to selectively tension said body.

15. A chucking arbor comprising an elongated tubular body having a pair of axially spaced, outwardly bowed, radially flexible, inherently resilient portions, said body adapted to fit into an internal bore of a workpiece to be chucked and said bowed portions being normally slightly larger in diameter than the bore, a plunger in said body, a seat disposed adjacent one end of the body and engaged by one end of said plunger, and a screw in the other end of said body movable against said plunger to force the same against said seat whereby to place said body under tension and to flex said bowed portions sufficiently so that the workpiece can be slipped onto the body, and whereby retraction of said screw relieves tension on the body and permits said bowed portions to expand against and tightly clamp said workpiece.

16. A chucking arbor comprising an elongated tubular body having a pair of axially spaced, outwardly arched, radially flexible, inherently resilient portions, said body adapted to fit into an internal bore of a workpiece to be chucked and said arched portions being normally slightly larger in diameter than the bore, a plunger in said body, seat-forming means adjacent one end of the body and engaged by one end of said plunger, a screw in the other end of said body movable against said plunger to force the same against said seat whereby to place said body under tension and to contract said arched portions sufficiently so that the workpiece can be slipped onto the body, and whereby retraction of said screw relieves tension on the body and permits said arched portions to expand against and tightly clamp said workpiece, sockets at opposite ends of said body for receiving the head and tailstock centers of a machine tool, said body having a noncircular outer surface adjacent one end thereof, and a driving dog having an opening receiving and conforming to said noncircular outer surface for rotatably driving said body.

17. An expansion arbor comprising an elongated tubular body of inherently resilient material, said body having axially spaced portions each provided with a plurality of circumferentially spaced longitudinal slots, the material between said slots being longitudinally arched radially outwardly of the body and said arched portions adapted to engage and tightly clamp a workpiece on said body, internal screw threads adjacent one end of the body, a headed screw extending axially through said body and engaging said threads, and antifriction means under the head of said screw, whereby tightening of said screw stresses the body longitudinally to expand the arched portions of the body radially against a workpiece disposed on the body.

18. An expansion arbor comprising an elongated tubular body having an internally threaded opening at one end, a radial shoulder adjacent the other end thereof, and at least two axially spaced clamping sections intermediate said opening and said shoulder, each clamping section provided with a plurality of circumferentially spaced longitudinal slots and portions of said sections intermediate the slots being longitudinally arched radially outwardly of the body, a screw extending axially through said body threaded into said opening, said screw having a head portion formed with a tapered, annular inner surface disposed in confronting relation to said shoulder, and antifriction bearings confined between said shoulder and the annular surface of said head, whereby tightening of said screw places said body under compression and expands the longitudinally arched portions of said clamping sections against a workpiece on the body.

19. An expansion arbor comprising an elongated sleevelike element having axially spaced clamping sections, each of said sections having a plurality of circumferentially spaced, longitudinal slots and the portions of the sections between said slots being arched radially outwardly, said arched portions at their points of greatest diameter being larger in diameter than the other portions of said element and being inherently flexible so that the element can be inserted into a bore which is larger than the main body of the sleeve but smaller than the normal diameter of said clamping sections.

20. An expansion arbor having a tubular chucking portion of deformable, inherently resilient material, said chucking portion having longitudinally spaced sections adapted to receive and to clamp a workpiece, each of said sections having a plurality of coextensive, circumferentially spaced, longitudinal slots and the portions of said sections intermediate said slots being longitudinally arched radially inwardly of the body, said arched portions adapted to engage the workpiece externally at longitudinally spaced points and operable to disengage said workpiece by longitudinally flexing said chucking portion.

21. An expansion arbor having an intermediate tubular chucking portion of deformable inherently resilient material, and circumferentially continuous tubular terminal portions, said tubular chucking portion adapted to receive a workpiece to be chucked and having slots therein so as to be radially expansible and contractible to grip or release the workpiece and said terminal portions maintaining a constant diametrical dimension regardless of the expanded or contracted condition of said chucking portion, and actuator means on said arbor operative to stress the same axially to actuate said chucking portion.

22. An expansion arbor having an intermediate tubular chucking portion of deformable inherently resilient material, and circumferentially continuous tubular terminal portions, said tubular chucking portion adapted to receive a workpiece to be chucked and having slots therein so as to be radially expansible and contractible to grip or release the workpiece and said terminal portions maintaining a constant diametrical dimension regardless of the expanded or contracted condition of said chucking portion, and actuator means on said arbor operative to tension the same so as to prepare said chucking portion to receive a workpiece.

23. An expansion arbor having an intermediate tubular chucking portion of deformable inherently resilient material, and circumferentially continuous tubular terminal portions, said tubular chucking portion adapted to receive a workpiece to be chucked and having slots therein so as to be radially expansible and contractible to grip or release the workpiece and said terminal portions maintaining a constant diametrical dimension regardless of the expanded or contracted condition of said chucking portion, and actuator means on said arbor operative to place said chucking portion under compression so as to engage the latter positively with a workpiece in operative association therewith.

GEORGE HOHWART.
ERNEST F. HOHWART.

REFERENCES CITED

The following references are of record in the file of this patent:

UNITED STATES PATENTS

| Number | Name | Date |
|---|---|---|
| 1,245,251 | McGregor | Nov. 6, 1917 |
| 1,930,669 | Varcoe et al. | Oct. 17, 1933 |
| 2,282,676 | Pigott | May 12, 1942 |
| 2,469,873 | Ernest | May 10, 1949 |
| 2,509,673 | Church | May 30, 1950 |
| 2,513,412 | Holsing | July 4, 1950 |